(12) United States Patent
Sami et al.

(10) Patent No.: US 11,156,531 B2
(45) Date of Patent: Oct. 26, 2021

(54) VIBRATION SENSOR PACKAGE

(71) Applicant: HARSCO TECHNOLOGIES LLC, Fairmont, MN (US)

(72) Inventors: Syed Reza Sami, Irmo, SC (US); Michael Petersen, Scottville, MI (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 446 days.

(21) Appl. No.: 16/055,724

(22) Filed: Aug. 6, 2018

(65) Prior Publication Data
US 2020/0041380 A1  Feb. 6, 2020

(51) Int. Cl.
*G01M 13/045* (2019.01)
*G01H 11/08* (2006.01)
*B60R 11/00* (2006.01)
*G01H 1/14* (2006.01)
G01M 13/028 (2019.01)

(52) U.S. Cl.
CPC ............ *G01M 13/045* (2013.01); *G01H 1/14* (2013.01); *G01H 11/08* (2013.01); *B60R 2011/0003* (2013.01); *B60R 2011/0052* (2013.01); *G01M 13/028* (2013.01)

(58) Field of Classification Search
CPC .... G01M 13/045; G01M 13/028; G01H 1/14; G01H 11/08; B60R 2011/0003; B60R 2011/0052
USPC .................................. 73/593, 587, 659, 660
See application file for complete search history.

(56) References Cited

U.S. PATENT DOCUMENTS

| | | | | |
|---|---|---|---|---|
| 4,237,454 A | * | 12/1980 | Meyer | G01H 1/003 310/323.21 |
| 2012/0074812 A1 | * | 3/2012 | Fujimoto | H01L 41/1136 310/323.01 |

* cited by examiner

*Primary Examiner* — Lisa M Caputo
*Assistant Examiner* — Rose M Miller
(74) *Attorney, Agent, or Firm* — Norton Rose Fulbright US LLP

(57) ABSTRACT

A sensor package for sensing vibration is described. The sensor package includes a carrier and a piezoelectric module coupled to the carrier. A wireless vibration sensor is further coupled to the carrier at a distance from the piezoelectric module. The sensor package further includes one or more conductive paths coupling the piezoelectric module to the wireless vibration sensor. The sensor package may be disposed on a bearing housing of a rail vehicle. The sensor package may also be utilized in marine, land and aviation applications.

20 Claims, 8 Drawing Sheets

VIBRATION SENSOR PACKAGE

BACKGROUND

Generally, railroad tracks include a pair of parallel rails coupled to a series of laterally extending ties (or sleepers). Ties may be made from concrete or wood. Each tie is coupled to the rails by metal tie plates and/or spring clips. The ties are disposed on a ballast bed. The ballast may be a hard particulate material, such as gravel. The ballast filled space between the ties is called a crib.

Although appearing rigid, rails are flexible members that can bend and distort, for example under the load of trains passing over. The ballast acts like a cushion absorbing some of the shock. Ballast can also help keep the rail level and allow moisture and rain water to drain away.

During installation and maintenance, ballast may be "tamped" to maintain proper position of the ties. Tamping involves agitating the ballast to allow the particles to reposition, and compact it under the tie. Tampers may also include track stabilizer workheads for applying pressure to a track structure. Additional maintenance procedures may also require actuation of workheads extending from the rail vehicle.

Rail maintenance devices, such as a tamping device, include one or more workheads mounted on a motorized vehicle that travels on the rails. A workhead may include a pair of elongated, vertically extending tools structured to move together vertically and horizontally. In the tamping context, such workheads cooperate to move together in a pincer-like motion. The workhead may have two sets of tools spaced so that each tool may be disposed on opposite lateral sides of a rail. The workhead may further include a vibration device configured to rapidly vibrate the tools.

The vibration device is generally a hydraulic actuator, which may be comprised of a number of parts, including a hydraulic motor, an eccentric shaft, connecting rods and a number of bearings. Monitoring the bearing life of bearings within the workhead can prove challenging given the need to locate sensors on the bearing housings in order to pick up bearing vibration frequencies. For example, the housing of the workhead may not permit hard wired connections to be installed from the sensor. Also, the surface of the bearing housing is not static, which can lead to sensors coming loose. While blue tooth sensors may be one solution, replacing the batteries of such sensors can be problematic due to the location of the sensors.

While such problems exist in the rail industry as is described more fully herein, such problems are not limited to the rail industry. For example, similar problems may exist with respect to any difficult to access bearing housing, including those associated with large engines (for example, crank shaft bearings in heavy marine engines). Still further, such problems are not limited to bearings but are also applicable to scenarios where vibration monitoring is desired (e.g., for parts other than bearings). Improved sensors for monitoring bearing life of difficult to access bearing housings is thus desired, and more generally improved sensors for monitoring vibration of components is desired.

BRIEF SUMMARY

In one embodiment, a sensor package for sensing vibration (e.g., of a bearing) is described. The sensor package includes a carrier and a piezoelectric module coupled to the carrier. A wireless vibration sensor is further coupled to the carrier at a distance from the piezoelectric module. The sensor package further includes one or more conductive paths coupling the piezoelectric module to the wireless vibration sensor. Related methods are described.

In another embodiment, a rail vehicle having a frame and a workhead coupled to the frame is described. The workhead is operable to operate one or more tools coupled to the workhead. The workhead includes one or more tool holder assemblies for coupling the one or more tools to the workhead. The workhead further includes one or more connector rods coupled to the one or more tool holder assemblies and a drive shaft extending through the connector rods. Further, the workhead includes one or more bearings disposed between the one or more connector rods and the drive shaft and one or more sensor packages coupled to the one or more connector rods to sense vibration of the one or more bearings. The sensor package includes a carrier, a piezoelectric module coupled to the carrier, a wireless vibration sensor coupled to the carrier, and one or more conductive paths coupling the piezoelectric module to the wireless vibration sensor.

DETAILED DESCRIPTION

Embodiments of a self-energizing sensor and related methods for sensing bearing vibration frequency signatures are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure. Further, while an exemplary embodiment is described in applying the described self-energizing sensor in a workhead of a rail vehicle, it is to be appreciated that the self-energizing sensor of the present disclosure may be utilized in a variety of industries in which it is desired to sense bearing vibration frequency signatures. For example, the present disclosure may be applicable to bearings used in large engines, such as marine engines. Further, it is to be appreciated that the self-energizing sensor described herein may be used to sense vibration of components other than bearings.

Figure 1:
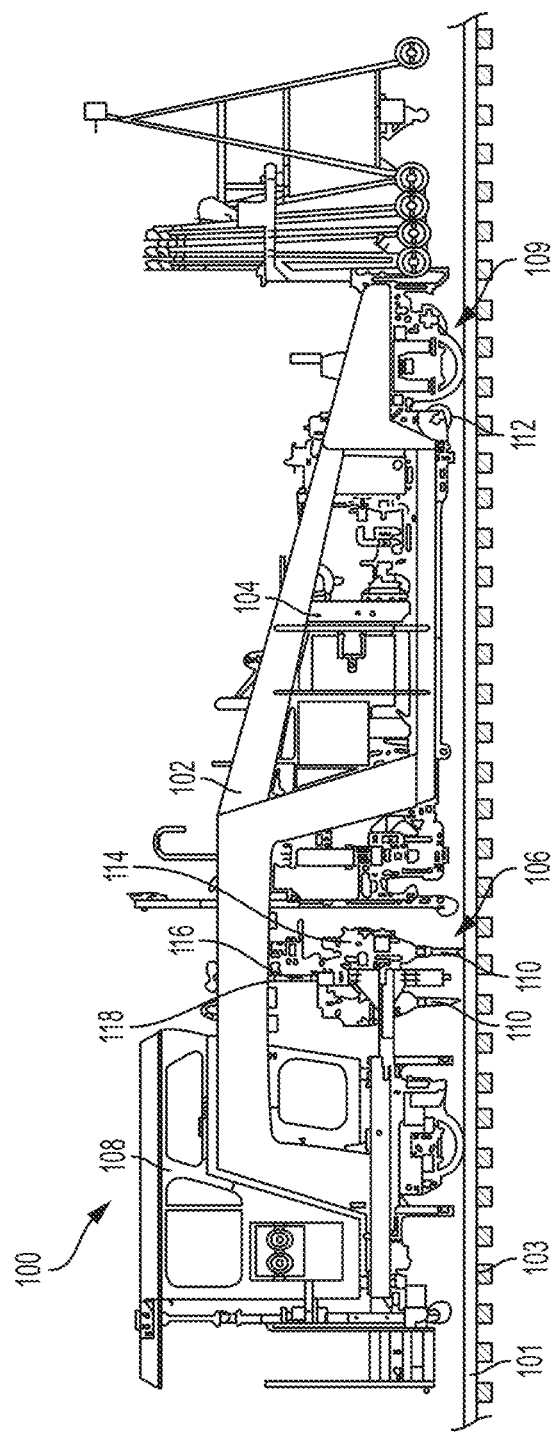
FIG. 1 shows a tamping machine rail vehicle where a self-energizing sensor according to the present disclosure can be implemented, according to an example embodiment.

In an embodiment, the self-energizing sensor according to the present disclosure is employed in a tamping machine rail vehicle, as illustrated in FIG. 1. It is to be appreciated that the self-energizing sensor of the present disclosure may be employed in a variety of rail vehicles, including manned or drone rail maintenance vehicles. FIG. 1 shows a tamping vehicle 100 that includes a frame assembly 102, a propulsion device 104, a tamping device 106, and a cabin 108. In drone embodiments, the cabin 108 may be removed.

Frame assembly 102 includes a plurality of rigid frame members and a plurality of wheels 109 that are configured to travel on a pair of rails 101. Tamping vehicle 100 travels across a pair of rails 101, disposed over a series of rail ties 103. The rails 101 and series of ties 103 are disposed over a bed of ballast. The propulsion system 104 is configured to move tamping vehicle 100. The tamping device 106 is configured to tamp rail ties 103.

The tamping device 106 may include multiple workheads. In the side view of FIG. 1, one workhead can be viewed while another workhead is also included at an opposite side corresponding with the other rail. Any number of workheads (2, 4, etc) may be included.

The tamping device 106 is coupled to the frame assembly 102 via a subframe 116 and an actuator 118. The actuator 118 is preferably a hydraulic actuator and is operable to lower the tamping device 106 such that paddles 110 of the tamping device are inserted into the ballast where the squeezing and vibration action tamps the ballast. In a work cycle, the tamping vehicle 100 advances to position the tamping device 106 over a tie. The actuator 118 is actuated to lower the tamping device 106 to carry out the tamping of the ballast by actuation of the linear actuator vibrators 120. Then, the actuator 118 is actuated to raise (and in some cases stow) the tamping device 106 for travel to the next tie.

Figure 2:
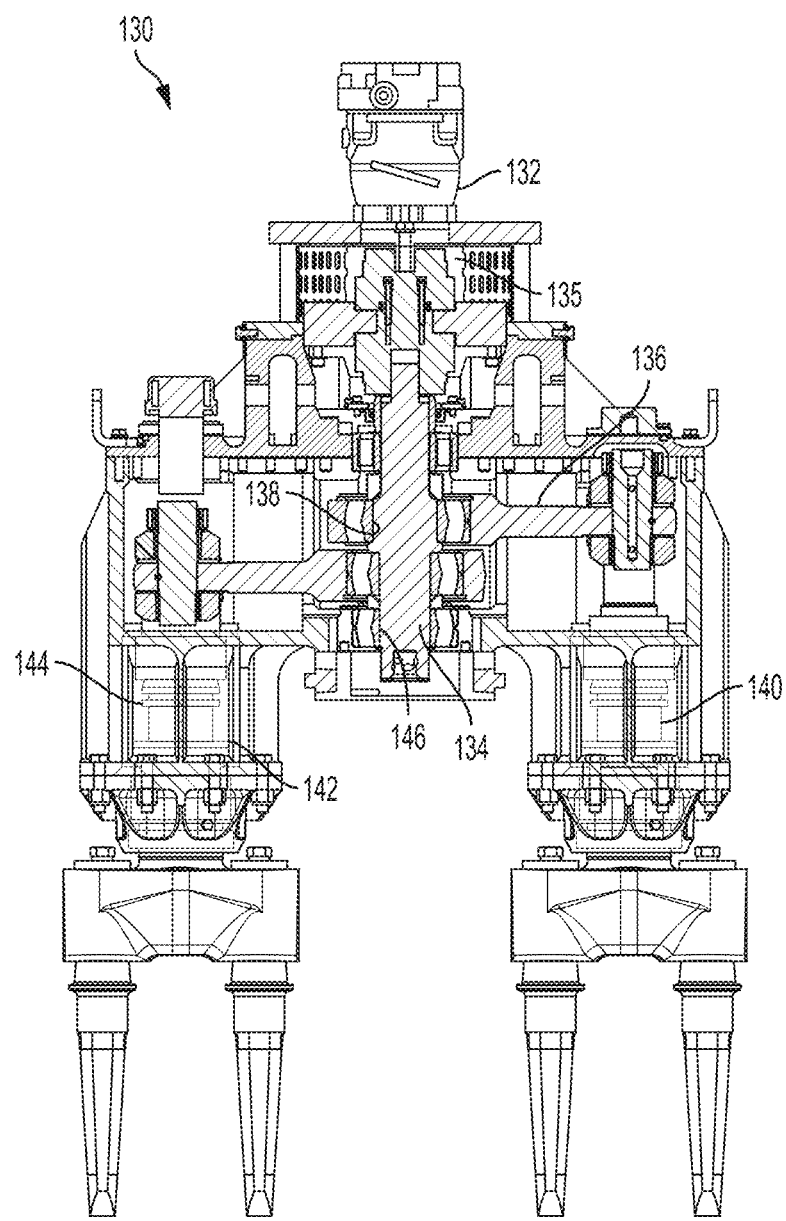
FIG. 2 shows a front, sectional view of a workhead of the rail vehicle of FIG. 1.

Referring to FIG. 2, an exemplary workhead for utilizing the self-energizing sensor described herein is labeled with reference numeral 130. The workhead 130 includes a number of components that work together in carrying out tamping operations. The workhead 130 includes a hydraulic motor 132, which is coupled to a drive shaft 134 through a flexible coupling 135. In some embodiments, the drive shaft 134 may be an eccentric drive shaft that induces vibration. The drive shaft 134 is disposed through a pair of connector rods 136, which include spherical roller bearings 138 disposed on an inside surface of the connector rods between the associated connector rods and the drive shaft 134. Through actuation of the hydraulic motor 132, the drive shaft 134 is operable to impart oscillations to tool holder assemblies 140 through the connector rods 136, which in turn, impart oscillations to paddles (not shown) coupled to the tool holder assemblies. The tool holder assemblies 140 also include bearings, such as needle roller bearings 142 and ball bearings 144. Also, the drive shaft 134 includes a spherical roller bearing 146 at a lower portion thereof.

It is desirable to include sensors on the workhead that correspond to the bearings in order to monitor bearings and estimate functionality and the remaining life of such bearings. In order to perform such monitoring, the sensors sense the bearing vibration frequency signatures. However, to properly perform such sensing operations, the sensors need to be located in contact with the bearing housings in order to pick up the bearing vibration frequencies. The sensed bearing vibration frequencies are then fed to a radio or similar transmission device that can then transmit the frequencies to a data storage and analysis system. While the bearings associated with the drive shaft 134 and the tool holder assemblies 140 are able to accommodate sensors at static mounting surfaces adjacent to the bearing housings, the bearings of the connecting rod assemblies do not have an external and static mounting surface for mounting sensors.

Figure 3A:
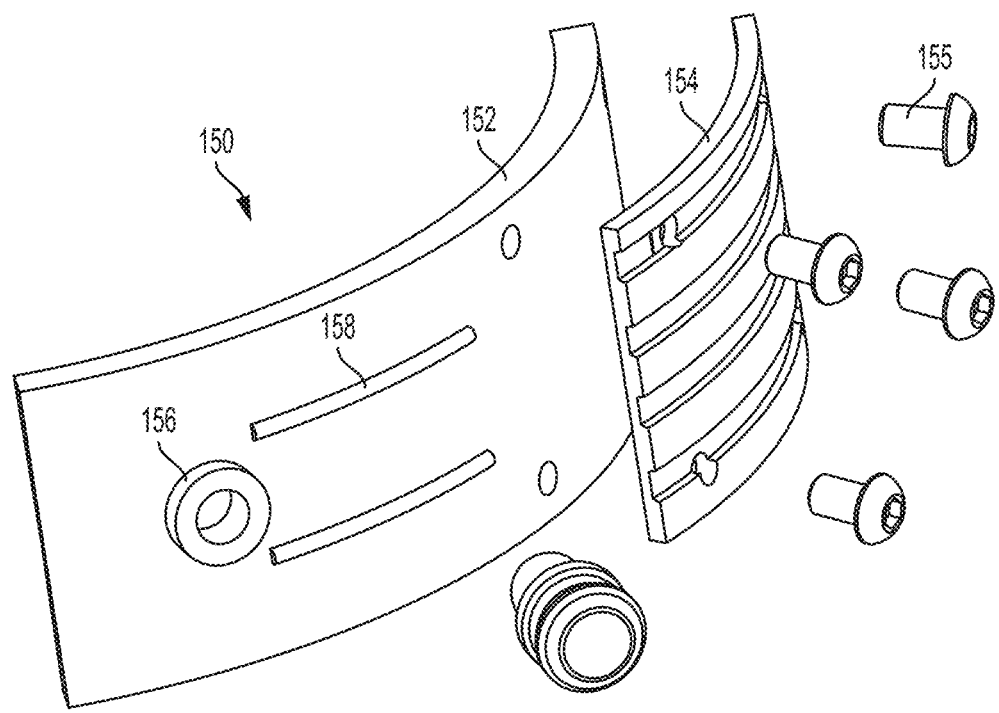
FIG. 3A shows an isometric, exploded view of a self-energizing sensor package according to the present disclosure.
Figure 3B:
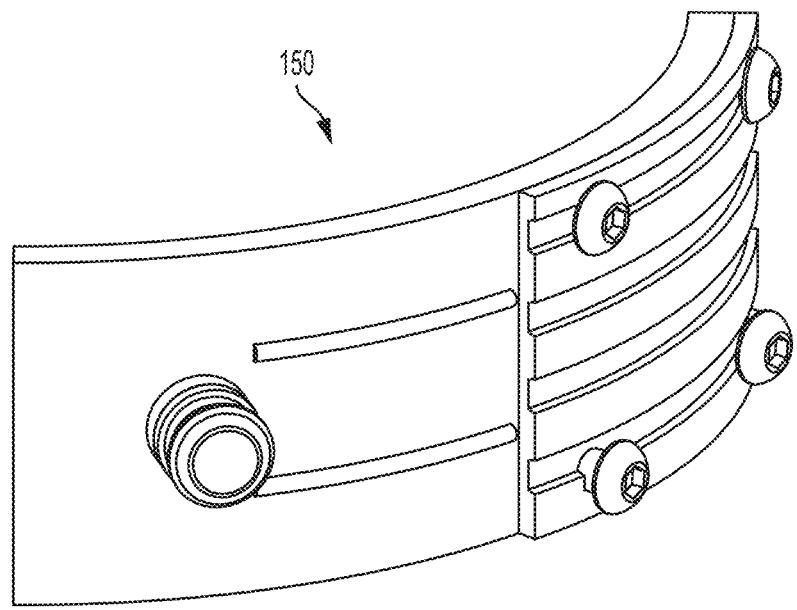
FIG. 3B shows an isometric view of the self-energizing sensor package of FIG. 3A.

Referring to FIGS. 3A and 3B, a self-energizing sensor package 150 according to the present disclosure addresses the problem of mounting sensors on the bearing housing, which in the embodiment discussed with reference to FIG. 2 is the connector rod 136. The sensor package 150 includes a carrier 152, which may be curved to match the contour of the connector rod to which it is coupled. The sensor package 150 further includes a piezoelectric module 154, which may also be curved to match the contour of the carrier 152. A number of connectors 155, such as set screws, may be used to mount the piezoelectric module 154 to the carrier 152. The piezoelectric module 154 is operable to derive an electrical charge from the mechanical stress applied from oscillation of the drive shaft into the connector rods. The piezoelectric module 154 is operably coupled to a vibration sensor 156 disposed on the carrier 152 via one or more conductive paths 158. In embodiments where the carrier 152 is curved, the piezoelectric module 154 and the sensor 156 may be disposed on the convex side of the carrier. In some embodiments, the vibration sensor 156 is a blue tooth sensor capable of wirelessly transmitting sensed data. In some embodiments, the conductive paths 158 are achieved through wiring. While the conductive paths may be wired, the vibration sensor 156 is wireless in that no wires are needed to power the sensor. The vibrations sensor 156 is also battery-less, and instead relies on power provided through the piezoelectric module 154.

Figure 4:
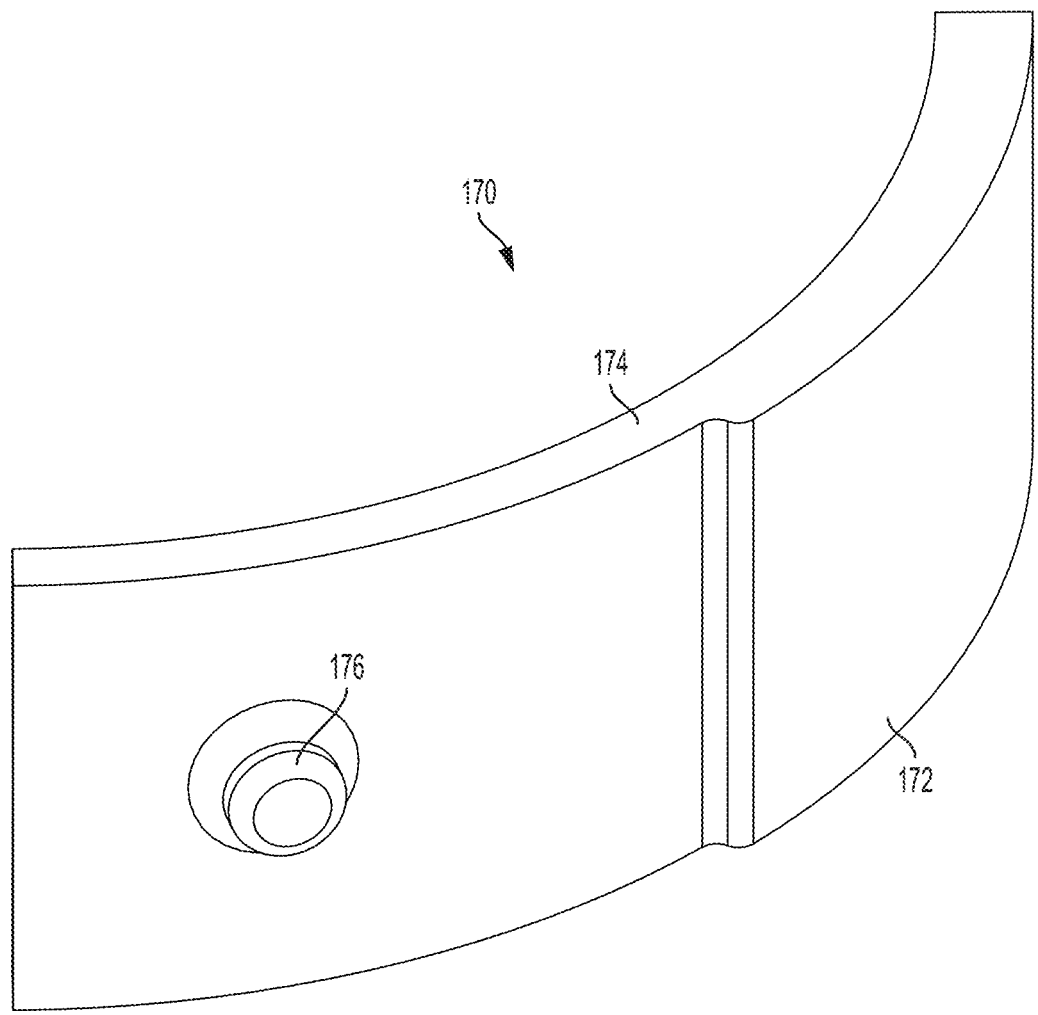
FIG. 4 shows an isometric view of an alternative self-energizing sensor package.

In an alternative embodiment, and with reference to FIG. 4, a sensor package 170 is depicted, which is similar to sensor package 150, but is provided in a potted arrangement. That is, a piezoelectric module 172 is potted to a carrier 174, such as through a thermosetting plastic or silicone rubber gel. Such an arrangement removes the need for mounting screws. The embodiment of FIG. 4 further includes conductive paths (not shown) from the piezoelectric module 172 to a vibration sensor 176 coupled to the carrier 174.

Figure 5:
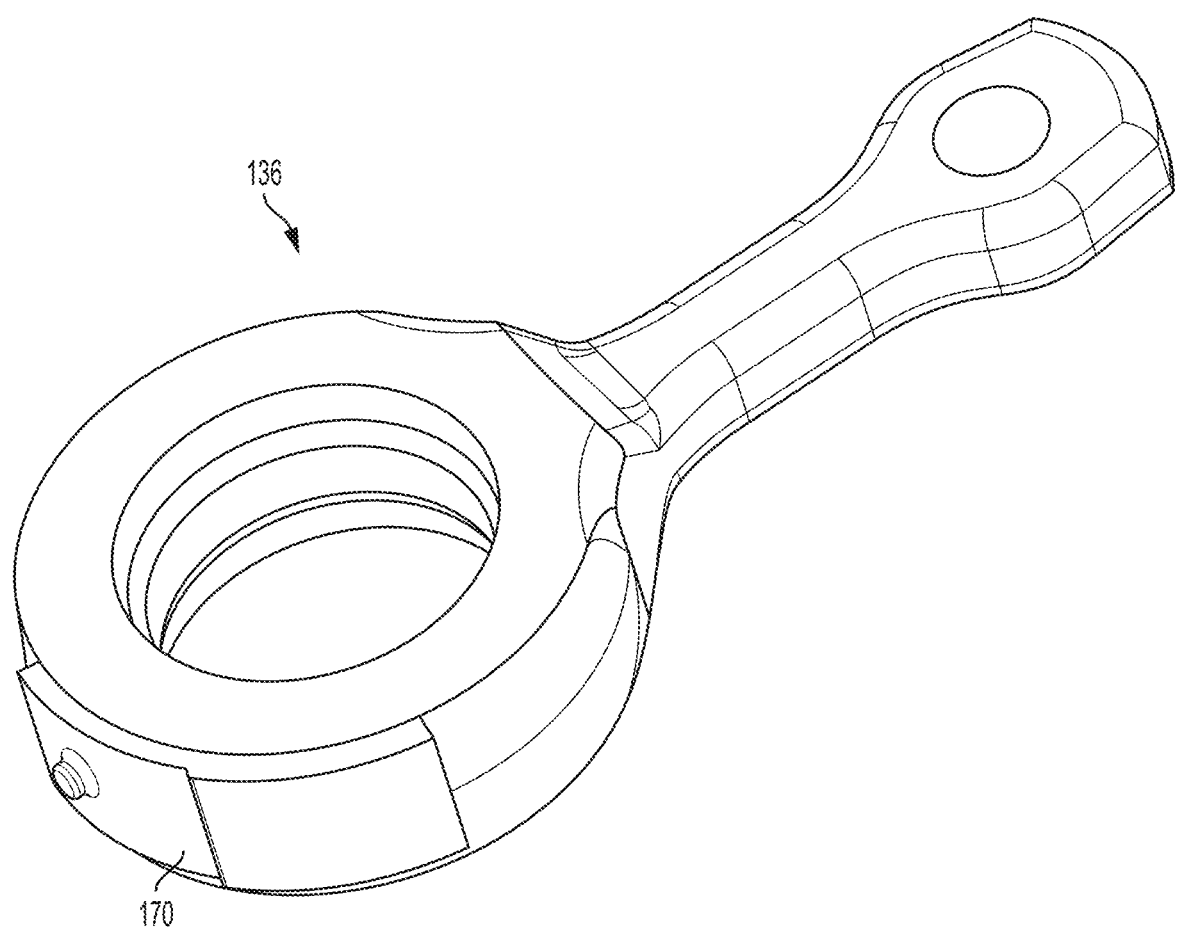
FIG. 5 shows an isometric view of a connector rod having a self-energizing sensor coupled thereto.

FIG. 5 depicts one of the connector rods 136 having the potted sensor package 170 coupled thereto. The sensor package 170 may be coupled to the connector rod 136 via an epoxy or adhesive such that no holes are drilled in the sensor package 170 or connector rod 136. Of course, in other embodiments, the sensor package 150 may be coupled to the connector rod 136 in a manner similar to that described with respect to sensor package 170.

Figure 6:
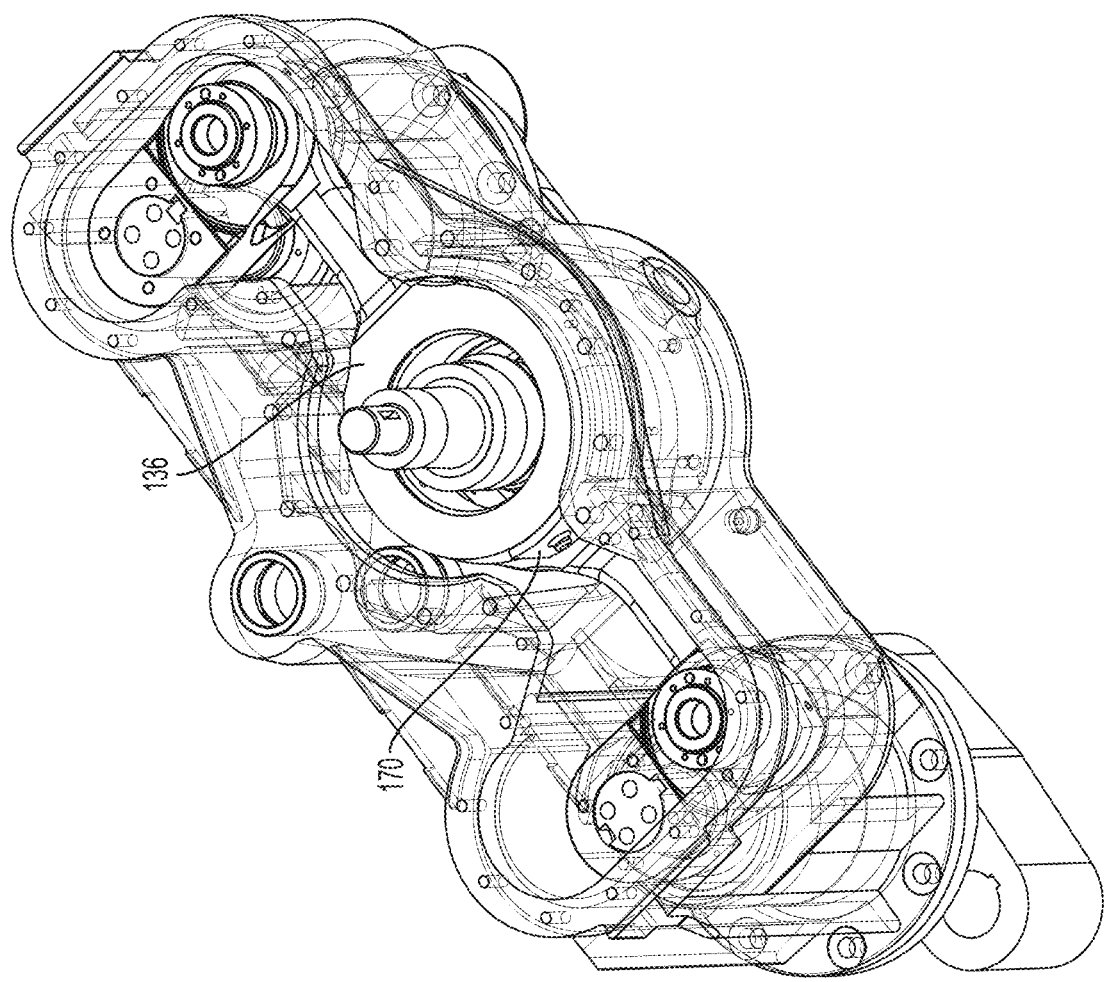
FIG. 6 shows an isometric view of a connector rod with self-energizing sensor disposed within a workhead.

FIG. 6 depicts the sensor package 170 coupled to one of the connector rods 136. As is readily apparent, no hard wiring of the sensor to an external power source is necessary, and there is no need to utilize a battery, thus removing the difficult step of having to replace the battery when it goes end of life. Rather, the piezoelectric module 154 powers the sensor 156 via oscillations of the connector rod 136 induced through driving of the drive shaft 134. Thus, in a sense, the sensor 156 is "self-energizing" in the sense that no battery or hard wiring is required to power the sensor.

Figure 7:
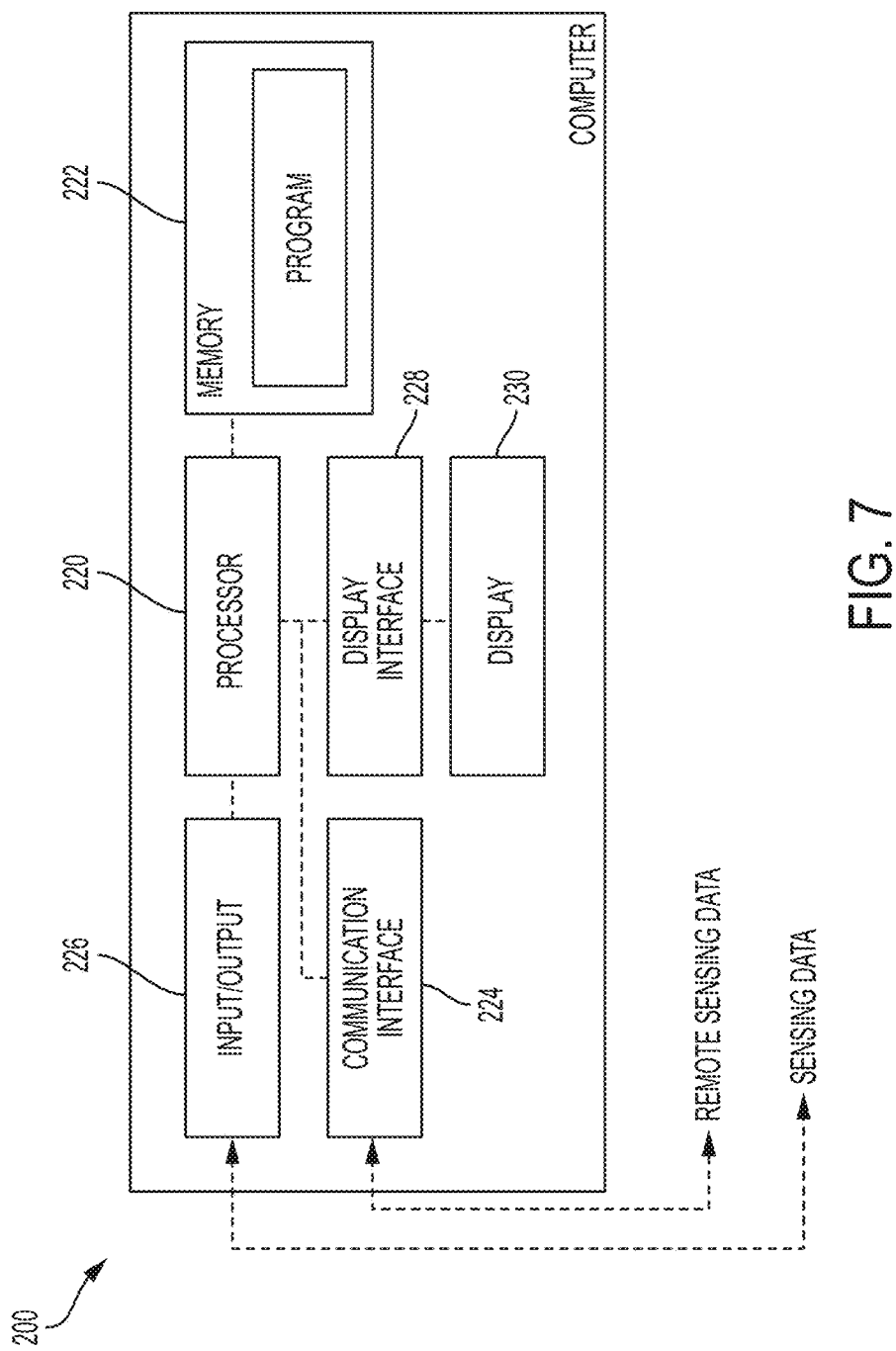
FIG. 7 shows a data processing system for receiving and processing sensed vibration data.

As discussed above, the sensor 156 senses the bearing vibration frequency of the bearing associated with the connector rod 136 and feeds that signal wirelessly to a radio or other transmission device that can then relay the data to a data storage and analysis system. In this regard, and with reference to FIG. 7, a data storage and analysis system may take the form of a computer or data processing system 200 that includes a processor 220 configured to execute at least one program stored in memory 222 for the purposes of performing one or more of the processes disclosed herein, including analysis of the bearing vibration frequency data obtained by the sensor 156. The processor 220 may be coupled to a communication interface 224 to receive remote sensing data, e.g., the bearing vibration frequency data, as well as transmit instructions to other computing systems. The processor 220 may also receive and transmit data via an input/output block 226. In addition to storing instructions for the program, the memory 222 may store preliminary, intermediate and final datasets involved in techniques that are described herein. Among its other features, the data processing system 200 may include a display interface 228 and a display 230 that displays the various data that is generated as described herein. It will be appreciated that the data processing system 200 shown in FIG. 7 is merely exemplary in nature and is not limiting of the systems and methods described herein.

Figure 8:
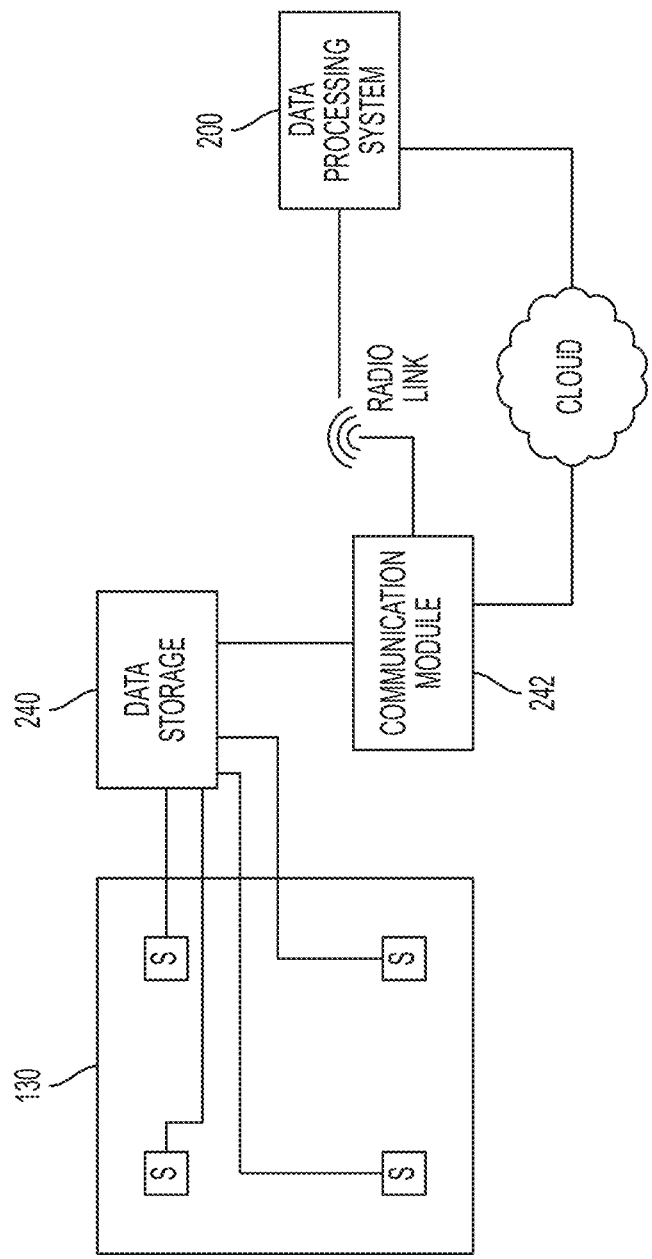
FIG. 8 shows a schematic illustration of a communication path for transmitting sensed vibration data from a vibration sensor to a data processing system.

FIG. 8 illustrates schematically an exemplary communication interface for transmitting data from the sensors (including sensor 156) disposed throughout the workhead 130. In one embodiment, the sensors S provide data to a data storage device 240 on the rail vehicle 100. The data storage device 240 transmits data to a wireless communication module 242, which may link to one or both of a radio link (e.g., 900 MHz) and a local area network (LAN) that provides access to the cloud. In this manner, sensed data may be transmitted to the computer system 200 described above.

While the sensor packages 150, 170 have been described for use on difficult to access bearings within a tamper vehicle 100, it will be appreciated that this disclosure is not limited to rail vehicles that perform tamping operations. For example, any rail vehicle that has difficult to access bearings can also realize advantages of the present disclosure. It will further be appreciated that this disclosure is not limited to rail vehicles and the disclosed sensor packages may be used in any application in which it is desired to measure life of bearings by measuring bearing data, including bearing vibration frequency signature. For example, non-rail applications are contemplated, such as large engines in the areas of aviation, land and marine applications. Still further, the present disclosure is not limited to sensing vibrations of bearings. Indeed, the sensor package described herein may be used to sense vibrations of any difficult to access component where vibration monitoring is desired.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

The invention claimed is:

1. A sensor package for sensing vibration, comprising:
a carrier;
a piezoelectric module coupled to the carrier;
a vibration sensor coupled to the carrier at a distance from the piezoelectric module; and
one or more conductive paths coupling the piezoelectric module to the vibration sensor
wherein the carrier is curved to define a concave and a convex side of the carrier, the vibration sensor and the piezoelectric module being disposed on the convex side of the carrier.

2. The sensor package of claim 1, wherein the piezoelectric module is mechanically coupled to the carrier via one or more connectors.

3. The sensor package of claim 2, wherein the one or more conductive paths include wires.

4. The sensor package of claim 1, wherein the piezoelectric module is coupled to the carrier via a potting material.

5. The sensor package of claim 4, wherein the vibration sensor is configured to receive power from the piezoelectric module.

6. The sensor package of claim 1, wherein the vibration sensor is configured to wirelessly transmit sensed data, and the vibration sensor is powered via the piezoelectric module.

7. The sensor package of claim 1, wherein the sensor package is disposed on a rail vehicle.

8. A rail vehicle, comprising:
a workhead configured to be coupled to a frame and operate one or more tools, the workhead comprising:
one or more tool holder assemblies configured to couple the one or more tools to the workhead;
one or more connector rods coupled to the one or more tool holder assemblies;
a drive shaft extending through the connector rods;
one or more bearings disposed between the one or more connector rods and the drive shaft; and
one or more sensor packages coupled to the one or more connector rods, the one or more sensor packages configured to sense vibration of the one or more bearings;
wherein the sensor package includes a carrier, a piezoelectric power source coupled to the carrier, a vibration sensor coupled to the carrier, and one or more conductive paths coupling the piezoelectric power source to the vibration sensor.

9. The rail vehicle of claim 8, wherein the piezoelectric power source is mechanically coupled to the carrier via one or more connectors.

10. The rail vehicle of claim 9, wherein the one or more conductive paths include wires.

11. The rail vehicle of claim 8, wherein the piezoelectric power source is coupled to the carrier via a potting material.

12. The rail vehicle of claim 11, wherein the piezoelectric power source is configured to produce an electrical charge based on oscillation of the drive shaft and deliver the electrical charge to the vibration sensor.

13. The rail vehicle of claim 8, wherein the carrier is curved to define a concave and a convex side of the carrier, the vibration sensor and the piezoelectric power source being disposed on the convex side of the carrier.

14. The rail vehicle of claim 8, further comprising a hydraulic motor coupled to the drive shaft.

15. The rail vehicle of claim 14, further comprising a flexible coupling between the hydraulic motor and the drive shaft.

16. A method for sensing vibration, comprising:
   sensing vibration of a workhead configured to operate one or more tools via one or more sensor packages, the workhead comprising:
      one or more tool holder assemblies configured to couple the one or more tools to the workhead;
      one or more connector rods coupled to the one or more tool holder assemblies; and
      one or more sensor packages coupled to the one or more connector rods, the one or more sensor packages having a carrier, a piezoelectric module coupled to the carrier, a vibration sensor coupled to the carrier at a distance from the piezoelectric module, and one or more conductive paths coupling the piezoelectric module to the vibration sensor; and
   wirelessly transmitting the sensed vibration to a data processing system.

17. The method of claim 16, wherein the step of sensing vibration includes sensing the vibration of a bearing housing disposed between the one or more connector rods and a drive shaft.

18. The method of claim 16, further comprising:
   producing, by the piezoelectric module, an electrical charge; and
   powering the vibration sensor via the electrical charge.

19. The sensor package of claim 1, wherein the vibration sensor is configured to wirelessly transmit data to an external device.

20. The sensor package of claim 1, wherein the piezoelectric module is configured to:
   produce an electrical charge based on vibration of the carrier; and
   deliver the electrical charge to the vibration sensor.

* * * * *